US007451398B1

(12) United States Patent
Rohrs

(10) Patent No.: US 7,451,398 B1
(45) Date of Patent: Nov. 11, 2008

(54) PROVIDING CAPITALIZATION CORRECTION FOR UNSTRUCTURED EXCERPTS

(75) Inventor: Christopher Rohrs, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 138 days.

(21) Appl. No.: 10/716,951

(22) Filed: Nov. 18, 2003

(51) Int. Cl.
*G06F 15/00* (2006.01)
*G06F 17/00* (2006.01)

(52) U.S. Cl. .................. 715/271; 715/255; 715/256; 715/257; 715/258; 715/259; 715/260; 715/261

(58) Field of Classification Search ......... 715/531–534, 715/530, 540, 255–261, 271
See application file for complete search history.

(56) References Cited

U.S. PATENT DOCUMENTS

| 4,991,094 | A | * | 2/1991 | Fagan et al. | 704/9 |
|---|---|---|---|---|---|
| 5,101,375 | A | * | 3/1992 | Goldhor | 715/531 |
| 5,224,038 | A | * | 6/1993 | Bespalko | 715/531 |
| 5,410,475 | A | * | 4/1995 | Lu et al. | 704/1 |
| 5,528,491 | A | * | 6/1996 | Kuno et al. | 704/9 |
| 5,761,689 | A | * | 6/1998 | Rayson et al. | 715/533 |
| 6,278,967 | B1 | * | 8/2001 | Akers et al. | 704/2 |
| 6,285,999 | B1 | | 9/2001 | Page | |
| 6,549,897 | B1 | * | 4/2003 | Katariya et al. | 707/5 |
| 6,922,809 | B2 | * | 7/2005 | Coden et al. | 715/531 |
| 2002/0099744 | A1 | * | 7/2002 | Coden et al. | 707/531 |
| 2004/0098247 | A1 | * | 5/2004 | Moore | 704/4 |

OTHER PUBLICATIONS

Shahraray, Behzad and Gibbon, David C., "Automated Authoring of Hypermedia Documents of Video Programs," ACM Multimedia 95—Electronic Proceedings, Nov. 5-9, 1995, pp. 1-12.*
Bachenko, et al. "A Parser for Real-Time Speech Synthesis of Conversational texts," AT&T Bell Laboratories, Proceedings of ACL Conference on Applied Natural Language Processing, Apr. 1992, pp. 25-32.*

* cited by examiner

*Primary Examiner*—William L Bashore
(74) *Attorney, Agent, or Firm*—Straub and Pokotylo; John C. Pokotylo

(57) ABSTRACT

Providing capitalization correction for unstructured excerpts is described. An excerpt of unstructured content is tokenized into a set of words. The set of words is analyzed for correct capitalization. Individual characters constituting at least one such word in the set of words are evaluated. The at least one such word is skipped if determined to be of a predefined type.

24 Claims, 9 Drawing Sheets

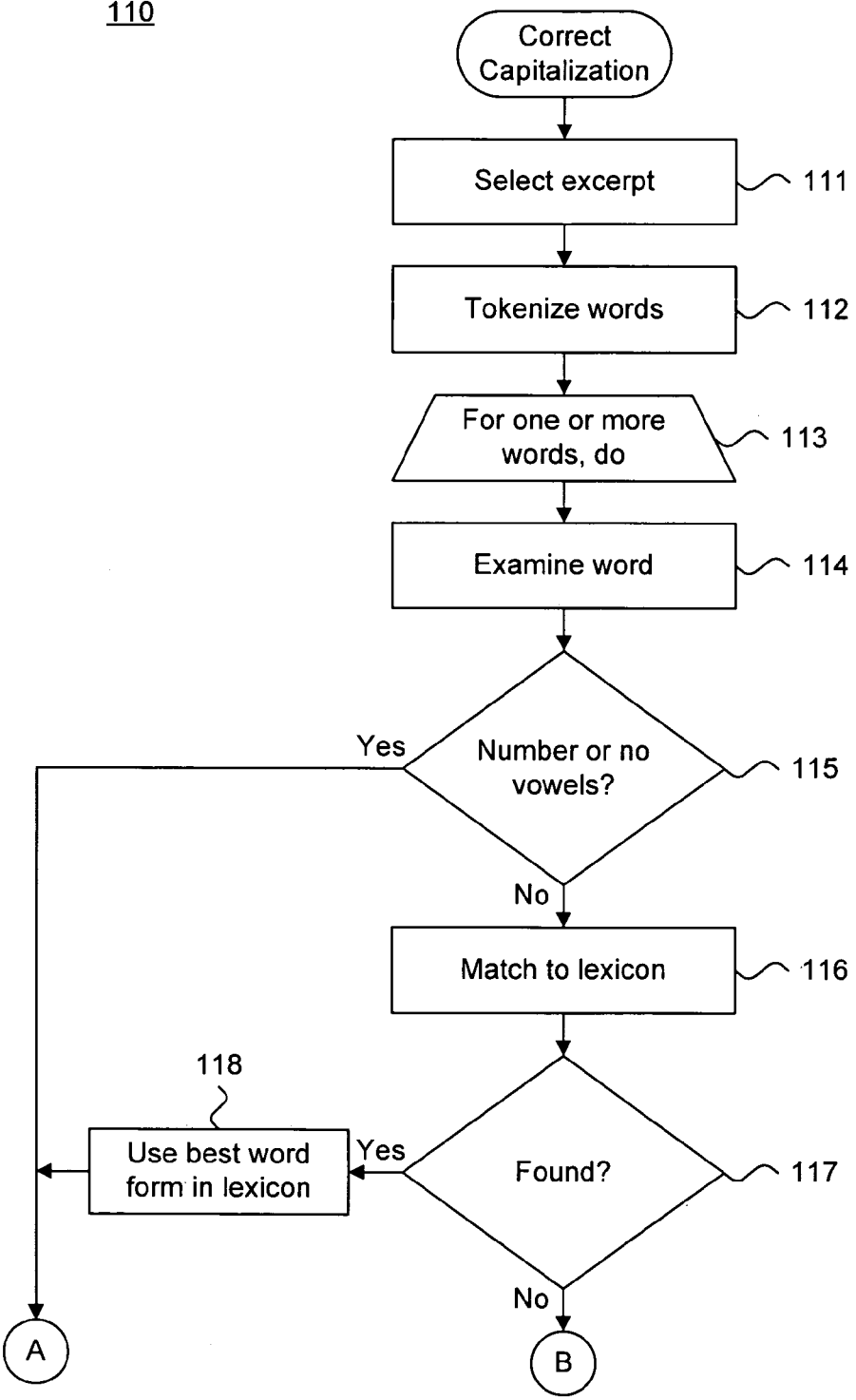
Figur 8.

PROVIDING CAPITALIZATION CORRECTION FOR UNSTRUCTURED EXCERPTS

FIELD OF THE INVENTION

The invention relates in general to text capitalization correction and, in particular, to providing capitalization correction for unstructured excerpts.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Web provides information via interconnected Web pages that can be navigated through embedded hyperlinks. In short, the Web provides desktop access to a virtually unlimited library of information in almost every language.

Web content is relatively unstructured in terms of grammar and standardized usage. Web content is often presented in the form of excerpts, which are primarily short, self-contained narratives including one or more headlines and accompanying text. Excerpts might occur as an artifact of the graphical nature of the Web, which emphasizes the tabular presentation of information. In addition, grammatical rules are often ignored in Web content, which can be typified by incomplete sentences, improper capitalization and often bad prose.

In an attempt to improve the presentation and quality of the Web content, many Web content publishers, particularly those publishers who provide Web content submissions received from third parties, have implemented editorial guidelines, which provide a set of rules for acceptable style and grammar. Editorial guidelines strive to provide improved appearance and uniformity, but may not necessarily attempt to enforce correct grammar. Editorial guidelines often function as a pre-condition to Web content publication and compliance can be difficult if a Web content submission is created through automated means. Moreover, compliance is particularly problematic for users who have a significant body of contributions, such as a Web retailer with a large product catalog that would be difficult to fully evaluate for editorial guideline compliance.

Third party advertisers, in particular, can be at odds with editorial guidelines, yet can benefit by advertising on-line. Compliance is important because the Web provides a vehicle to reach a potentially large audience inexpensively. Advertisements can be provided with existing Web content, such as in conjunction with on-line news and information. Advertisements can also be tied to results generated by search engines to build on the topical nature of the underlining query.

Web-based advertisements also tend to be unstructured and often contain only nouns, adjectives, conjunctions, and prepositions with little or no punctuation. Improper capitalization often occurs in the product or service name description. However, improper capitalization can render an advertisement ineligible for display by a Web content publisher that enforces correct capitalization and similar grammatical conventions.

Conventional approaches to ensuring compliance with editorial guidelines and similar requirements often employ manual or rote correction of word capitalization. However, such approaches can be slow, time-consuming and expensive.

Moreover, blanket capitalization correction can overcompensate by removing non-standard and "unusual" forms of acceptable capitalization, such as found in certain proper nouns. For instance, "PlayStation" is a properly capitalized registered trademark. Blanket capitalization correction can be particularly impractical for a large number of product or service advertisements.

Therefore, there is a need to improve capitalization correction of words identified in excerpts from, for instance, Web content. Preferably, such an approach would enforce grammatical and editorial guideline conventions and would accommodate frequently occurring yet non-standard capitalization variations.

There is a further need for generating a lexicon containing capitalization variations for use in capitalization correction. Preferably, such an generation should facilitate grammatical and editorial guideline compliance.

SUMMARY OF THE INVENTION

An embodiment provides a system and method for providing capitalization correction for unstructured excerpts. An excerpt of unstructured content is tokenized into a set of words. The set of words is analyzed for correct capitalization. Individual characters constituting at least one such word in the set of words are evaluated. The at least one such word is skipped if determined to be of a predefined type.

A further embodiment provides a system and method for building a lexicon for use in capitalization correction for unstructured excerpts. A list of word sets is assembled from unstructured content. Each word set includes a word and at least one variation on capitalization. Each word set is aggregated. At least one word set having significant statistics is identified. At least one such variation within the identified word set having a non-standard capitalization is selected. The at least one such variation is added to the lexicon Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
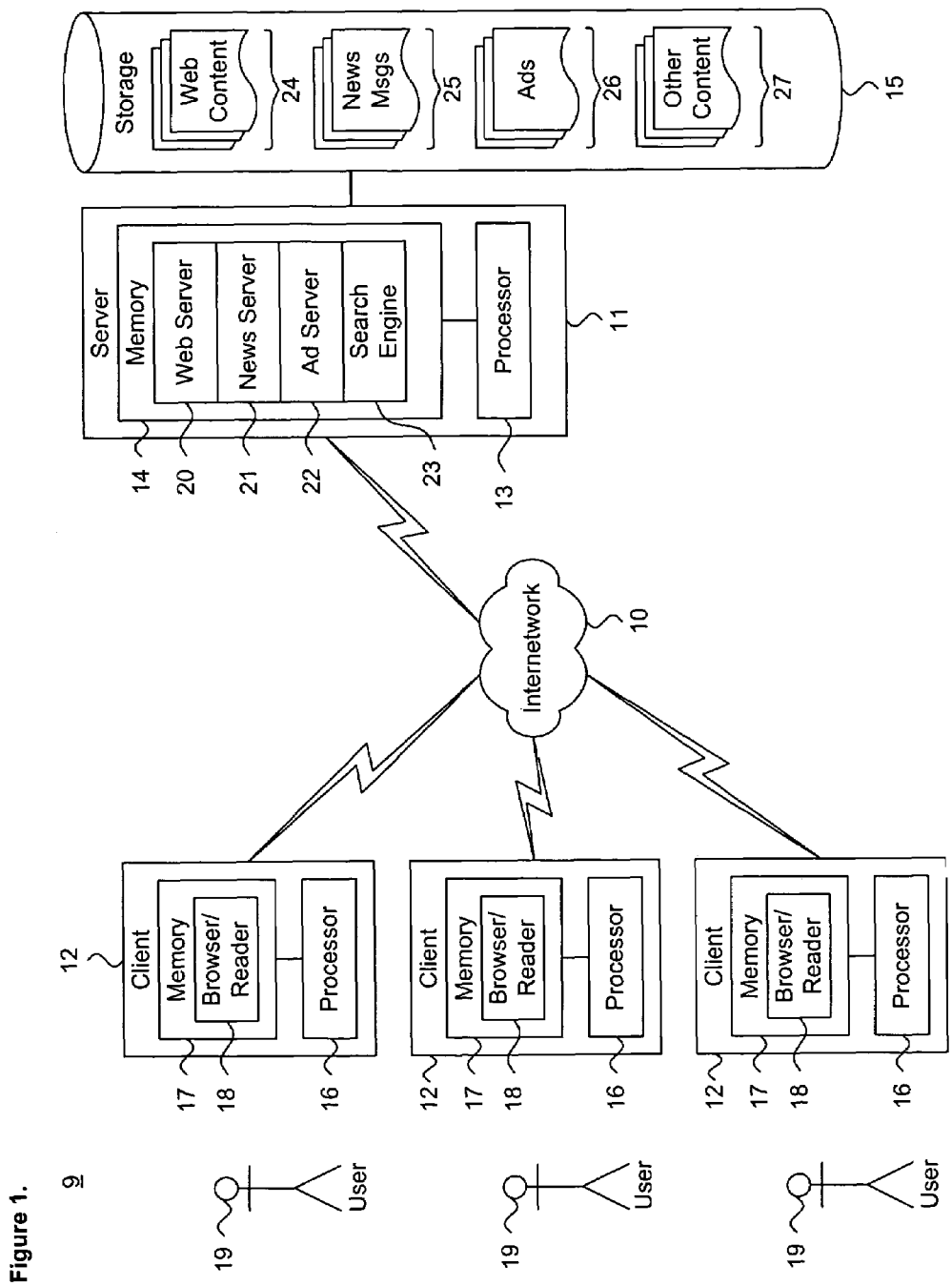
FIG. 1 is a block diagram showing a system for providing capitalization correction for unstructured excerpts, in accordance with the invention.

FIG. 1 is a block diagram showing a system 9 for providing capitalization correction for unstructured excerpts, in accordance with the invention. A plurality of individual clients 12 are communicatively interfaced to a server 11 via an internetwork 10, such as the Internet, or other form of communications network, as will be appreciated by one skilled in the art. The individual clients 12 are operated by users 19 who transact requests for Web content, news messages, advertisements, other types of content, and other operations through their respective client 12.

Each client 12 can be any form of computing platform connectable to a network, such as the internetwork 10, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as will be appreciated by one skilled in the art. The internetwork 10 includes various topologies, configurations, and arrangements of network interconnectivity components arranged to interoperatively couple with enterprise, wide area and local area networks and include, without limitation, conventionally wired, wireless, satellite, optical, and equivalent network technologies, as will be appreciated by one skilled in the art.

For Web content retrieval and news message posting and retrieval, each client 12 executes a Web browser and news reader application 18 ("Browser/Reader"). Web content 24 is requested via a Web server 20 executing on the server 11. Similarly, news messages ("News Msgs") 25 are posted and retrieved via a news server 21 also executing on the server 11. In addition, advertisements ("Ads") 26 are provided with the Web content 24, news messages 25, and other content 27 via an advertisement server ("Ad Server") 22 also executing on the server 11. The advertisements 26 provide stored advertisement feeds and can also include standardized advertisements that normalize the general layout and appearance of Web-based advertisements through a common format, such as product name and body. The advertisement server 22 can target and optionally generate the advertisements 26 for inclusion with or in lieu of the Web content 24, news messages 25, and other content 27, such as described in commonly-assigned U.S. patent application Ser. No. 10/676,195, filed Sep. 30, 2003, pending, the disclosure of which is incorporated by reference. Other types of server functionality can be provided, as will be appreciated by one skilled in the art. Note the Web browsing, news reading, and advertising functions could also be implemented separately as stand alone applications.

The server 11 maintains an attached storage device 15 in which the Web content 24, news messages 25, advertisements 26, and other content 27 are stored. The Web content 24, news messages 25, advertisements 26, and other content 27 could also be maintained remotely on other Web and news servers (not shown) interconnected either directly or indirectly via the internetwork 10 and which are preferably accessible by each client 12.

The capitalization of words appearing in all or part of the Web content 24, news messages 25, advertisements 26, and other content 27 can be improper. To assist with providing capitalization correction, a lexicon builder (not shown) builds a lexicon containing non-standard forms of capitalization as potentially occurring in the Web content 24, news messages 25, advertisements 26, and other content 27, as further described below with reference to FIG. 2. A capitalization corrector (not shown) corrects the capitalization of words occurring in unstructured excerpts of the Web content 24, news messages 25, advertisements 26, and other content 27, as further described below with reference to FIG. 4, and optionally references the non-standard forms of capitalizations maintained in the lexicon. The capitalization-corrected words can be used, for instance, in a title or heading. In a further embodiment, the capitalization of words is corrected for use, for instance, in a sentence or phrase having only the initial word and any proper nouns capitalized. Other forms of capitalization correction are possible.

In a further embodiment, a search engine 22 executes on the server 11 for processing queries for Web content 24, news messages 25, advertisements 26, and other content 27. Each query is meant to describe or otherwise identify information potentially retrievable via either the Web server 20 or news server 21. The information can include other information also determined to be relevant to the query. In one embodiment, each query provides characteristics, typically expressed as terms, including individual words and compounds. The search engine 22 receives a query, identifies matching Web content 24, news messages 25, advertisements 26, and other content 27, and sends back results conforming to the query preferences. Other styles, forms or definitions of queries, query characteristics, and related metadata are feasible, as will be appreciated by one skilled in the art.

In one embodiment, the search engine 22 identifies the Web content 24, news messages 25, advertisements 26, and other content 27 determined to be highly relevant in relation to a given set of search query terms, for example, using such techniques as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 24, news messages 25, advertisements 26, and other content 27, the search engine 22 operates on information characteristics describing potentially retrievable content. Note the functionality provided by the server 20, including the Web server 20, news server 21, advertising server 22, and search engine 23, could be provided by a loosely- or tightly-coupled distributed or parallelized computing configuration, in addition to a uniprocessing environment.

The individual computer systems, including server 11 and clients 12, include general purpose, programmed digital computing devices including a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Lexicon Builder

Figure 2:
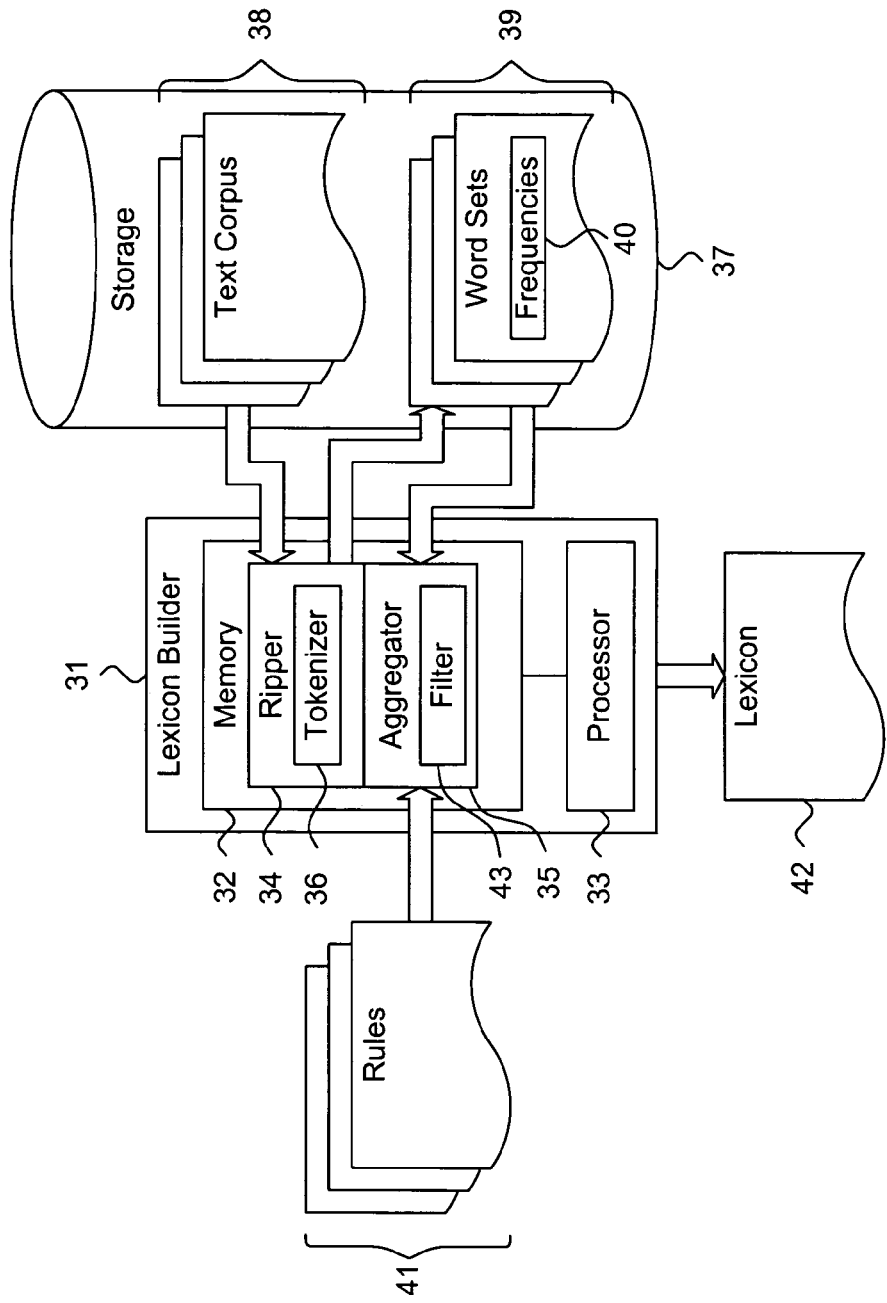
FIG. 2 is a functional block diagram showing a lexicon builder, in accordance with one embodiment of the invention.

FIG. 2 is a functional block diagram 30 showing a lexicon builder 31, in accordance with one embodiment. The lexicon builder 31 generates a lexicon 42, containing a list of words in lowercase and variations on observed forms of capitalization for each word. The lexicon 42 can optionally be used by a capitalization corrector to correct the capitalization of words appearing in unstructured excerpts of, for instance, Web content 24, news messages 25, advertisements 26, and other content 27, as further described below with reference to FIG. 4.

The lexicon builder 31 includes storage 37 for maintaining a text corpus 38 and word sets 39. The text corpus 38 includes documents and excerpts of the documents that include Web content, news messages, advertisements, and other content, including the Web content 24, news messages 25, advertisements 26, and other content 27 stored by the server 11 (shown in FIG. 1), as well as documents and excerpts from other sources. The word sets 39 include messages. Each message includes an individual word, capitalization variations, and an indication of frequencies of occurrence 40, as further described below with reference to FIG. 3.

The lexicon builder 31 includes a ripper 34 and aggregator 35. The ripper 34 generates the word sets 39 by identifying the individual words and capitalization variations, as further described below with reference to FIG. 6. The ripper 34 retrieves excerpts from the text corpus 38 and tokenizes the excerpts into individual tokens from which the individual words, capitalization variations, and frequencies of occurrence are determined. A word includes any sequence of characters appearing in a contiguous order or connected by an express grammatical connector, such as a hyphen or underscore. The excerpts of the text corpus 38 can be tokenized using regular expressions or with a tokenizer 36. Preferably, hyphenated words are split into multiple tokens.

The aggregator 35 generates the actual lexicon 42, as further described below with reference to FIG. 7. The aggregator 35 retrieves and analyses the word sets 39 and associated frequencies of occurrence 40 to identify statistically significant and non-standard forms of capitalization. For example, in one embodiment, one form of non-standard capitalization occurs when an individual letter other than the first letter is capitalized. In one embodiment, a capitalization variation is deemed statistically significant if, for instance, at least four or more occurrences are found in the text corpus 38, although other forms of statistical and metrics of significance are feasible, as will be appreciated by one skilled in the art. In addition, the aggregator 35 can apply rules 31 that formalize the conventions and practices found in the application of ordinary grammar and, for example, editorial guidelines. The aggregator 35 can apply the implicit rules 41 as a form of filter 43 to moderate the content of the lexicon 42.

When completed, the lexicon 42 contains a list of words, each having a non-standard form of capitalization for a statistically significant word identified in the text corpus 38. Alternatively, other forms of capitalization could be included in the lexicon 42, including standard capitalizations and lower case forms. The lexicon 42 can be used to correct capitalization and other Web content, news messages, advertisements, and other content, as will be appreciated by one skilled in the art. The capitalization-corrected words can be used, for instance, in a title or heading. In a further embodiment, the capitalization of words is corrected for use, for instance, in a sentence or phrase having only the initial word and any proper nouns capitalized. Other forms of capitalization correction are possible.

The individual computer system, including the lexicon builder 31, include general purpose, programmed digital computing devices including a central processing unit (processor 33), random access memory (memory 32), non-volatile secondary storage 37, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Word Sets and Lexicon Data Structure

Figure 3:
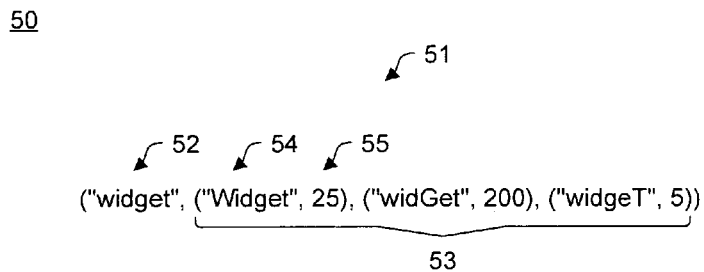
FIG. 3 is a data structure diagram showing, by way of example, a word set, which may be identified by the lexicon builder of FIG. 2.

FIG. 3 is a data structure diagram 50 showing, by way of example, a word set 51, which may be identified by the lexicon builder 31 of FIG. 2. Each word set 51 is an interim data structure used by the aggregator 35 (shown in FIG. 2) to build the lexicon 42. Each word set 51 is formed as a tuple, including a word 52, preferably stored in lower case, and a list of capitalization variations 53. Each capitalization variation 53 includes a non-standard capitalization 54 and an indication of a frequency of occurrence 55.

In the further embodiment, the lexicon 42 is structured as a form of hash table (not shown). The hash table is indexed by a lowercase version of each identified word and contains at least one preferred form of capitalization as a record value. Other forms of organization and structure for the lexicon 42 are possible, as will be appreciated by one skilled in the art.

Capitalization Corrector

Figure 4:
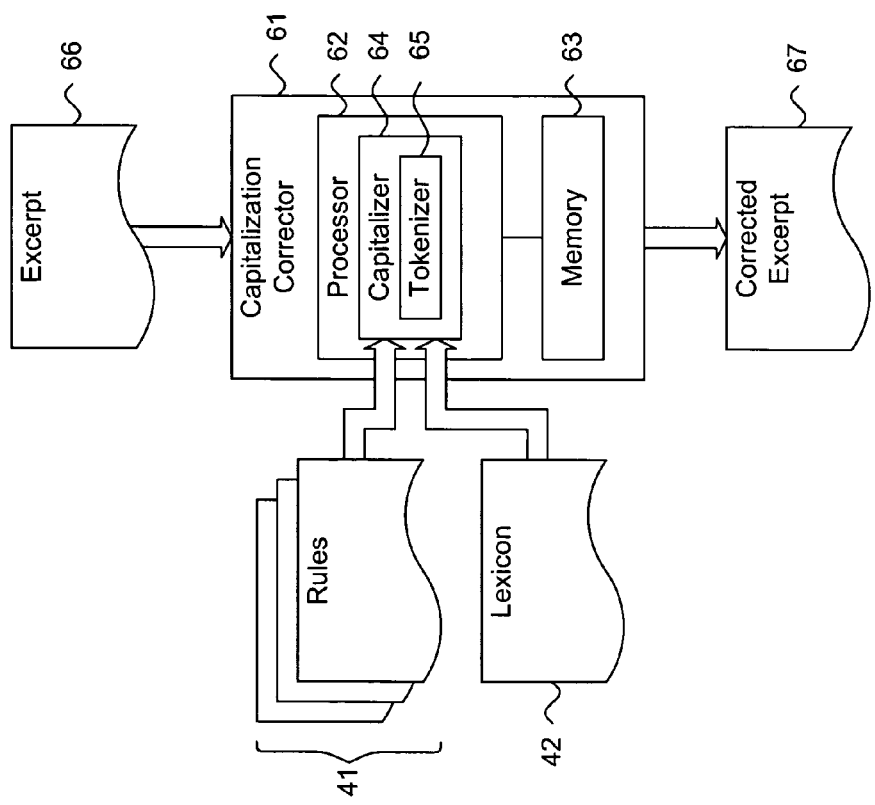
FIG. 4 is a functional block diagram showing a capitalization corrector, in accordance with one embodiment of the invention.

FIG. 4 is a functional block diagram 60 showing a capitalization corrector 61, in accordance with one embodiment. The capitalization corrector 61 receives an excerpt 66 and provides a corrected excerpt with one or more of the individual words correctly capitalized. The capitalization-corrected words can be used, for instance, in a title or heading. In a further embodiment, the capitalization of words is corrected for use, for instance, in a sentence or phrase having only the initial word and any proper nouns capitalized. Other forms of capitalization correction are possible. The capitalization corrector 61 can also operate on documents that include Web content, news messages, advertisements, and other content, including the Web content 24, news messages 25, advertisements 26, and other content 27, stored by the server 11 (shown in FIG. 1), as well as documents from other sources.

The capitalization corrector 61 includes a capitalizer 64. The capitalizer 64 tokenizes individual words identified within the excerpt 66 and applies the rules 41 to correct capitalization. Optionally, the capitalizer 64 references the lexicon 42 to accommodate non-standard capitalization variations, as further described below with reference to FIG. 8. In one embodiment, individual words within the excerpt 66 are tokenized with a regular expression or with a tokenizer 65. A word includes any sequence of characters appearing in a contiguous order or connected by an express grammatical connector, such as a hyphen or underscore. The capitalizer 64 applies rules implicit in the application of grammatical and style conventions and, for instance, editorial guidelines. The rules 41 include, by way of non-exclusive example, ignoring words that contain a number, have no vowels, or which constitute an article, conjunction, or preposition shorter than five characters and not appearing at the start of a phrase. Other forms of implicit rules are feasible, as will be appreciated by one skilled in the art.

Optionally, the capitalizer 64 references the list of words maintained in the lexicon 42. As each word is considered, the capitalizer 64 attempts to match the word against the words stored in the lexicon 42 and, if found, substitutes the non-standard capitalization variation retrieved from the lexicon 42. In a further embodiment, the capitalizer 64 corrects the capitalization of words for use in a sentence or phrase by correcting the capitalizations of only the initial word and any proper nouns, if necessary. The remaining words preferably appear in lower case and can remain uncorrected. Other forms of capitalization correction are possible.

The individual computer system, including the capitalization corrector 61, include general purpose, programmed digital computing devices including a central processing unit (processor 63), random access memory (memory 62), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Method Overview

Figure 5:
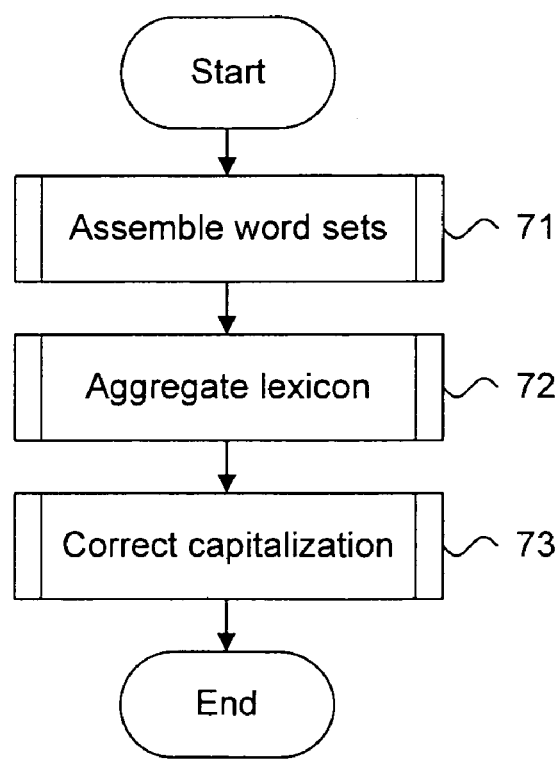
FIG. 5 is a flow diagram showing a method for providing capitalization correction for unstructured excerpts, in accordance with one embodiment of the invention.

FIG. 5 is a flow diagram showing a method 70 for providing capitalization correction for unstructured excerpts, in accordance with one embodiment of the invention. The method 70 is described as a sequence of process operations or steps, which can be executed, for instance, by the lexicon builder 31 of FIG. 2, the capitalization corrector 61 of FIG. 4, or other components.

The method 70 performs builds the lexicon 42 (blocks 71 and 72) and corrects the capitalization of unstructured excerpts 66 (block 73). The lexicon 42 is created in advance of capitalization correction, preferably as an off-line process. Capitalization correction can occur dynamically, such as during the serving of Web content. During lexicon building, word sets 39 are assembled (block 71) and the lexicon 42 is aggregated (block 72), as further described below respectively with reference to FIGS. 6 and 7. Finally, capitalization is corrected (block 73), as further described below with reference to FIG. 8. The routine then terminates.

Assembling Word Sets

Figure 6:
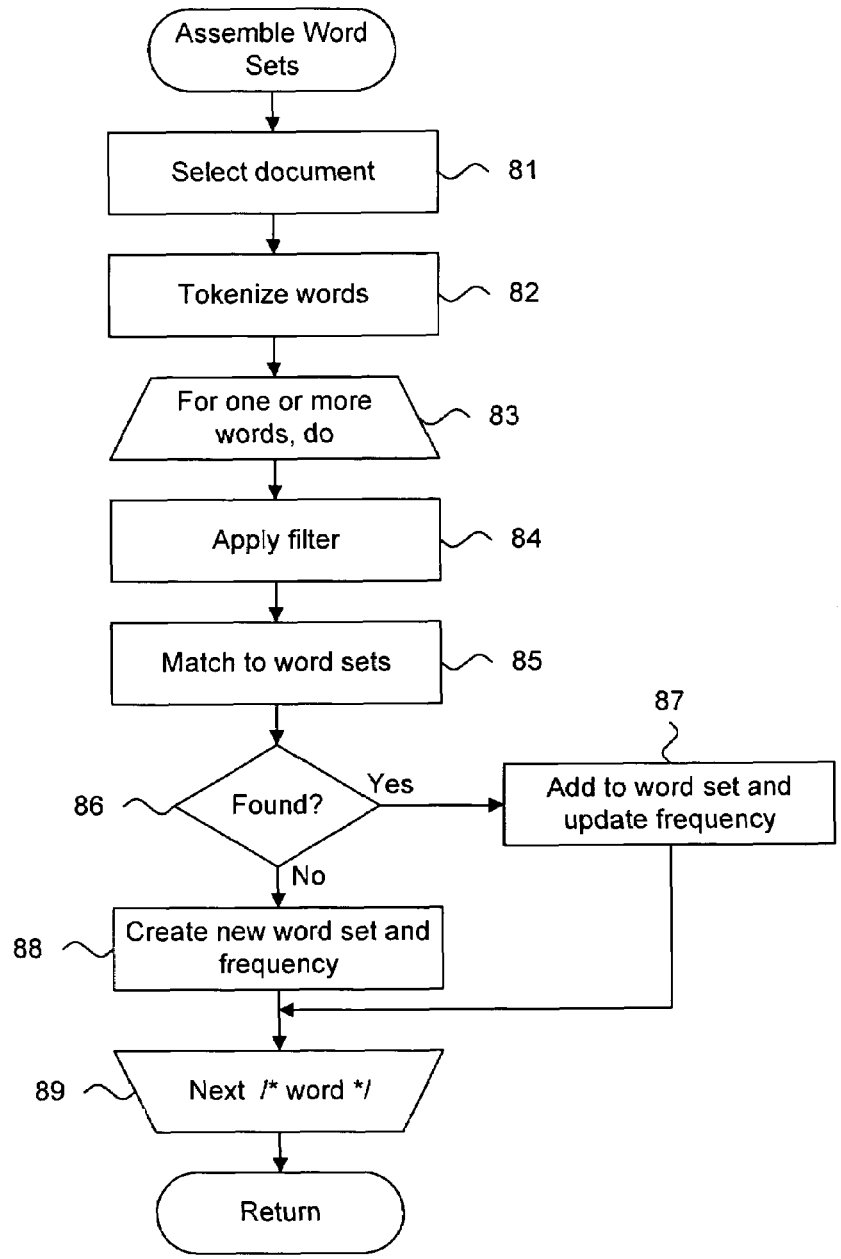
FIG. 6 is a flow diagram showing the routine for assembling word sets for use in the method of FIG. 5.

FIG. 6 is a flow diagram showing the routine 80 for assembling word sets 39 for use in the method 70 of FIG. 5. One purpose of this routine is to tokenize individual words identified in each excerpt 66 and to form the word sets 51, which include non-standard capitalizations 54 and frequencies of occurrence 55 for each tokenized word 52. The routine 80 is described as a sequence of process operations or steps, which can be executed, for instance, by the ripper 34 of FIG. 2, or other components.

One or more documents are selected from the text corpus 38 (block 81) as excerpts 66. The individual words and punctuation marks within each excerpt 66 are tokenized (block 82). A word includes any sequence of characters appearing in a contiguous order or connected by an express grammatical connector, such as a hyphen or underscore. One or more of the individual words is iteratively processed (blocks 83-88), as follows. First, one or more filters 43 are applied to the excerpt 66 and individual words in the excerpt 66 (block 84). For example, the filter 43 may be configured, such that words likely having improper capitalization as determined from within an excerpt 66 are skipped. Also, words which may appear at the start of a sentence are skipped. Alternatively, words could be filtered based on position within a sentence or phrase. Skipping improperly capitalized words also helps to ensure that content providers, such as advertisers, with overly zealous use of capitalization do not corrupt the lexicon 42 with excessive occurrences of improper capitalization variations. Potential improper capitalization can be determined in several ways. First, those excerpts having more than half of the individual letters in uppercase could be filtered and skipped. Similarly, the filter 43 could count the number of occurrences of a given form of capitalization from each content provider and limit the number of occurrences, subject to a maximum cap. Alternatively, the filter 43 could apply a "squash" function to normalize the word counts, such as by taking the logarithm of the word occurrence frequencies. Finally, the filter 43 could normalize the words relative to the source of the excerpt 66 to prevent the contribution from any one source from dominating the lexicon 42, such as could occur if a content provider included a large corpus containing improperly capitalized words.

Provided that the word is not filtered, the tokenized word is matched to an existing word set (block 85). If a match is found (block 86), the word is added to the word set 51 as a non-standard capitalization 54 and the associated frequency of occurrence 55 is updated (block 87). Otherwise, if not found (block 86), a new word set 39 is created by storing the non-standard capitalization 54 and the associated frequency of occurrence 55 (block 88). Processing continues with each remaining tokenized word (block 89), after which the routine returns.

Aggregating a Lexicon

Figure 7:
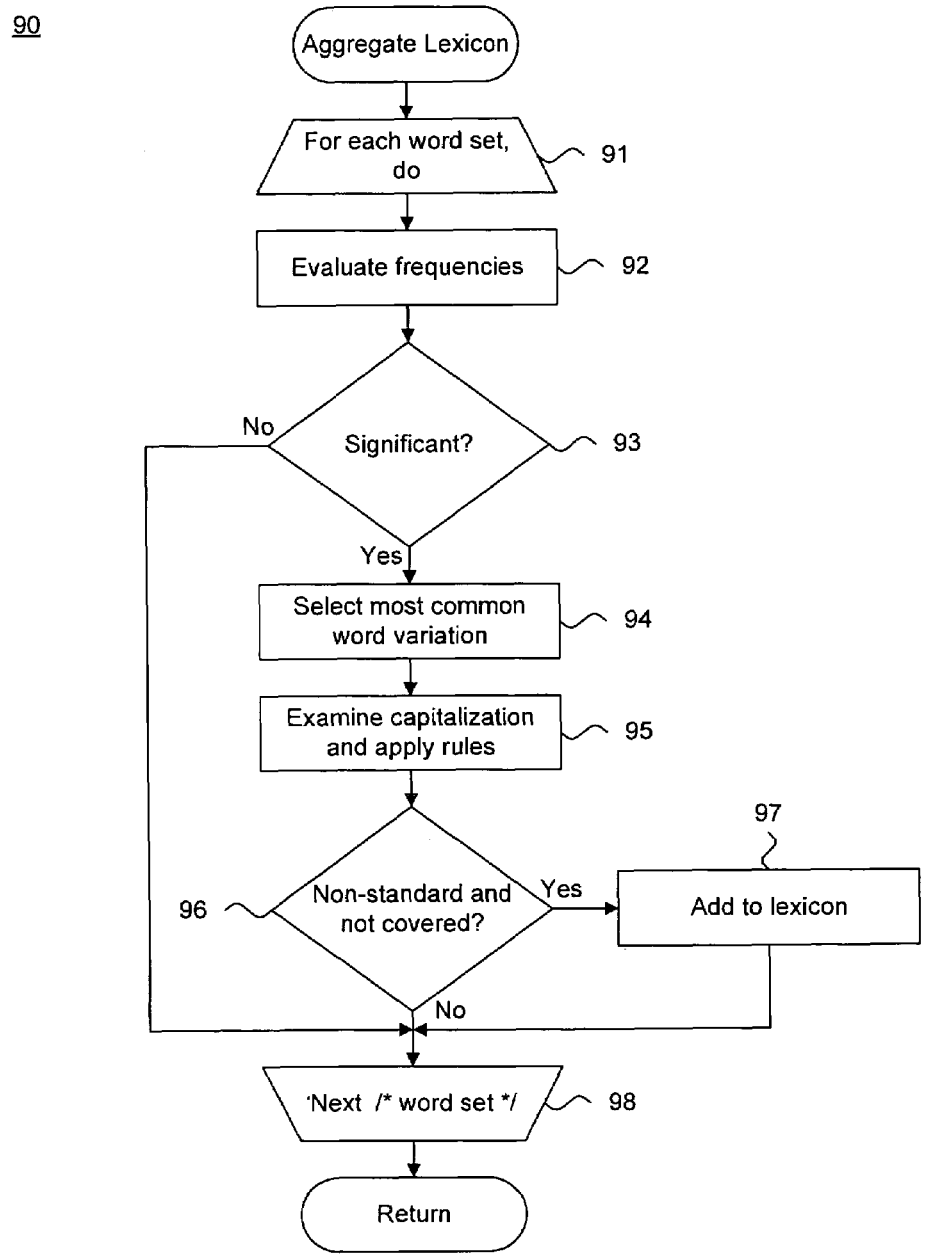
FIG. 7 is a flow diagram showing the routine for aggregating a lexicon for use in the method of FIG. 6.

FIG. 7 is a flow diagram showing the routine 90 for aggregating a lexicon 42 for use in the method 70 of FIG. 5. One purpose of this routine is to produce the lexicon 42, containing non-standard capitalization variations 53 of individual words 52 identified in unstructured excerpts 66. The capitalization variations 53 are selected based on statistical significance and preferably excluded from the implicit rules 41. The routine 90 is described as a sequence of process operations or steps, which can be executed, for instance, by the aggregator 34 of FIG. 2, or other components.

Each of the word sets 51 are iteratively processed (blocks 91-98), as follows. For each word set 51, the frequencies of occurrence 55 are evaluated (block 92) to determine whether at least one of the non-standard capitalizations 54 is statistically significant. In one embodiment, a non-standard capitalization 54 is considered statistically significant if at least four occurrences are identified, although other forms of statistics and metrics of significance are feasible, as will be appreciated by one skilled in the art. Thus, if statistically significant (block 93), one or more of the most common non-standard capitalizations 54 are selected from the word set 51 (block 94). Multiple forms of capitalization for the same word could be accommodated, for instance, by annotating each capitalization form with a frequency count. Capitalization forms occurring too infrequently would be skipped, but one or more capitalization forms would be stored into the lexicon 42 as alternative capitalization forms. During capitalization correction, the most frequent capitalization form would be selected if a word required correction. Otherwise, if the word matched one of the alternative capitalization forms, the word would be allowed, rather than corrected, if the alternative capitalization form occurred sufficiently frequently. Next, the capitalizations of the most common non-standard capitalizations 54 are examined and the rules 41 are applied (block 95). In one embodiment, only those non-standard capitalizations 54 not covered by one or more of the rules 41 (block 96) are added to the lexicon 42 (block 97). Alternatively, other forms of capitalization could be included in the lexicon 42, including standard capitalizations and lower case forms.

In one embodiment, non-standard capitalizations include words that include a capitalized letter other than the first letter. The rules 41 include skipping words containing numbers or lacking vowels, and "small" words not occurring at the start of a phrase. In English, "small" words are typically articles, conjunctions and prepositions shorter than five characters, although other forms of small words are possible. In addition, other non-small words could be provided in lower case. Other forms and variations of rules 41 are possible, as will be appreciated by one skilled in the art. By way of example, the capitalization variation "widGet" would be selected based on highest frequency of occurrence 55, having non-standard capitalization and complying with the rules 41. Processing continues with each remaining word set 51 (block 98), after which the routine returns.

Correcting Capitalization

Figure 8:
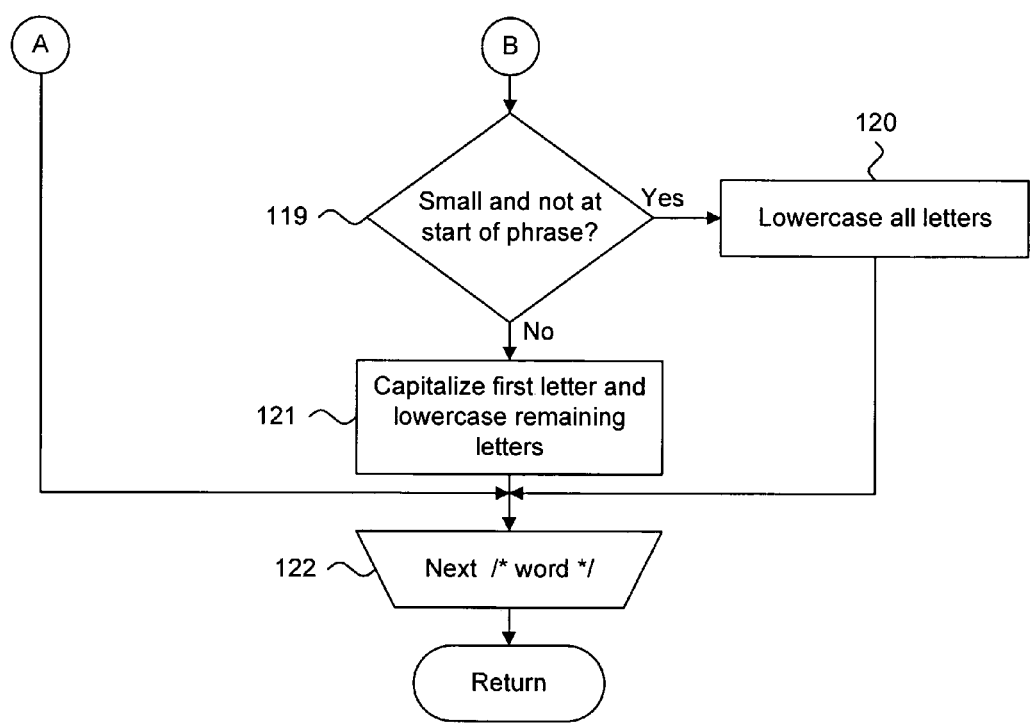
FIG. 8 is a flow diagram showing the routine for correcting capitalization for use in the method of FIG. 5.

FIG. 8 is a flow diagram showing the routine 110 for correcting capitalization for use in the method 70 of FIG. 5. One purpose of this routine is to correct the capitalization of individual words identified in an excerpt 66, based primarily on the rules 41 and, optionally, with reference to the lexicon 42. The capitalization-corrected words can be used, for instance, in a title or heading. In a further embodiment, the capitalization of words is corrected for use, for instance, in a sentence or phrase having only the initial word and any proper nouns capitalized. Other forms of capitalization correction are possible. The routine 110 is described as a sequence of process operations or steps, which can be executed, for instance, by the capitalization corrector 61 of FIG. 4, or other components.

An excerpt 66 is selected (block 111) and the individual words and punctuation marks within the excerpt 66 are tokenized (block 112). A word includes any sequence of characters appearing in a contiguous order or connected by an express grammatical connector, such as a hyphen or underscore. One or more of the tokenized words is iteratively processed (blocks 113-122), as follows. The tokenized word is first examined (block 114). If the tokenized word contains a number or lacks vowels (block 115), the tokenized word is skipped. In English, words containing a number or which lack vowels are generally non-standard words such as found, for instance, in product serial numbers. However, in other languages, word composition could vary and tokenized words containing a number or lacking vowels could be allowed. Otherwise, the tokenized word is optionally matched to the non-standard capitalizations maintained in the lexicon 42 (block 116). If the tokenized word is found in the lexicon 42 (block 117), the best matching word form found in the lexicon 42 is used (block 118). Otherwise, if the tokenized word is "small" and does not occur at the start of the phrase (block 119), the tokenized word is provided in lowercase (block 120). In English, a "small" word includes those words that are ordinarily not capitalized when appearing in a title, even though other words may be capitalized. Small words include articles ("a, an, the"), conjunctions ("and, but, or, nor"), and prepositions shorter than five characters ("as, at, by, for, etc."). However, in other languages, small words can include other types of words and articles, conjunctions and prepositions shorter than five characters could be allowed. In addition, other non-small words could be provided in lower case. Otherwise, the first letter of the tokenized word is capitalized and the remaining letters provided in lowercase (block 121). Processing continues with each remaining tokenized word in the excerpt 66 (block 122), after which the routine returns.

In a further embodiment, the capitalization of words is corrected for use in a sentence or phrase. The first letter of each sentence is capitalized; all other letters are lowercased. However, words found in the lexicon 42 are corrected with the best form, whether appearing at the start of or within the sentence or phrase. In addition, small words are only capitalized at the start of the sentence.

While the invention has been particularly shown and described as referenced to the embodiments thereof, those skilled in the art will understand that the foregoing and other changes in form and detail may be made therein without departing from the spirit and scope of the invention.

What is claimed is:

1. A computer system for building a lexicon for use in capitalization correction for unstructured excerpts, comprising:
   at least one processing unit;
   at least one storage device being coupled with the at least one processing unit and storing program code;
   a ripper adapted to assemble a list of word sets from unstructured content, at least one of the word sets comprising a word and at least two non-standard capitalization variations for the word; and
   an aggregator adapted to aggregate at least one of the word sets, the aggregator including
      an analyzer adapted to identify non-standard capitalization variations based on at least one criteria; and
      a non-standard capitalization selector adapted to select at least one of the identified non-standard capitalization variations within one of the at least one word sets, and adding the selected at least one of the identified non-standard capitalization variations to the lexicon, wherein the lexicon includes records, each record including a word, wherein the lexicon is indexed by the words included in the records, and wherein at least one of the records includes more than one non-standard capitalization variation.

2. A computer system according to claim 1, further comprising:
   a tokenizer adapted to tokenize the excerpt into the one or more words and one or more punctuation marks.

3. A computer system according to claim 2, wherein hyphenated words are split into a plurality of the words.

4. A computer system according to claim 1, wherein at least one of the non-standard capitalization variations occurs in an excerpt having fewer than half of individual letters provided in uppercase.

5. A computer system according to claim 1, further comprising:
   a normalizer adapted to normalize a plurality of the words extracted relative to a source of the unstructured excerpt.

6. A computer system according to claim 1, wherein non-standard capitalization variations that are identified based on one or more criteria comprise only those non-standard capitalization variations having at least four occurrences.

7. A computer system according to claim 1, wherein at least one of the non-standard capitalization variations has any individual letter other than the first individual letter provided in uppercase.

8. A computer system according to claim 1, further comprising:
   a validator adapted to apply implicit rules for capitalization, and skipping each of the non-standard capitalization variations subject to at least one such implicit rule.

9. A computer system according to claim 8, wherein the implicit rules comprise skipping each of the non-standard capitalization variations based on position within a sentence or phrase.

10. A computer system according to claim 8, wherein the implicit rules comprise at least one of (A) the non-standard capitalization variation being a number, (B) the non-standard capitalization variation having no vowels, and (C) the non-standard capitalization variation constituting at least one of an article, conjunction and preposition.

11. A computer system according to claim 8, wherein the implicit rules comprise normalizing a number of occurrences for each of the non-standard capitalization variations relative to a source of the non-standard capitalization variations.

12. A computer system according to claim 8, wherein each of the word sets includes a word and at least one non-standard capitalization variation, each of the at least one non-standard capitalization variation including a frequency of occurrence count.

13. A computer system according to claim 1, further comprising:
a hash table maintaining the lexicon.

14. A computer system according to claim 13, wherein the hash table is indexed by words.

15. A computer-implemented method comprising:
a) generating a plurality of word sets from a text corpus, at least one of the words sets including
a word identified from the text corpus,
at least one non-standard capitalization variation of the word included in the word set, and
a frequency of occurrence of each of the at least one non-standard capitalization variation of the word included in the word set;
b) generating a lexicon using the generated plurality of word sets, wherein the lexicon includes, for each of a plurality of words, at least one capitalization variation identified using at least one criteria, wherein at least one of the words of the lexicon includes more than one non-standard capitalization variation identified using the at least one criteria; and
c) storing the generated lexicon.

16. The computer-implemented method of claim 14 wherein a non-standard capitalization variation is identified using the at least one criteria only if it occurs at least four times in the text corpus.

17. The computer-implemented method of claim 14 further comprising:
d) accepting a word having a capitalization defining which, if any, of the characters of the word are capitalized; and
e) performing a capitalization correction function on the word using the generated lexicon.

18. The computer-implemented method of claim 17 wherein the act of performing a capitalization correction function includes
determining if the capitalization of the word matches a capitalization variation in the lexicon, and
not changing the capitalization of the word if it was determined to match a capitalization variation in the lexicon.

19. The computer-implemented method of claim 17 wherein the act of performing a capitalization correction function includes
determining if the capitalization of the word matches a non-standard capitalization variation in the lexicon, which non-standard capitalization variation meets a frequency criteria, and
not changing the capitalization of the word if it was determined to match a non-standard capitalization variation in the lexicon.

20. Apparatus comprising:
a) means for generating a plurality of word sets from a text corpus, at least one of the word sets including
a word identified from the text corpus,
at least one non-standard capitalization variation of the word included in the word set, and
a frequency of occurrence of each of the at least one non-standard capitalization variation of the word included in the word set; and
b) means for generating a lexicon using the generated plurality of word sets, wherein the lexicon includes, for each of a plurality of words, at least one capitalization variation identified using at least one criteria, wherein at least one of the words of the lexicon includes more than one non-standard capitalization variation identified using the at least one criteria.

21. The apparatus of claim 20 wherein a non-standard capitalization variation is identified using the at least one criteria only if it occurs at least four times in the text corpus.

22. The apparatus of claim 20 further comprising:
c) means for accepting a word having a capitalization defining which, if any, of the characters of the word are capitalized; and
d) means for performing a capitalization correction function on the word using the generated lexicon.

23. The apparatus of claim 22 wherein the means for performing a capitalization correction function
determine if the capitalization of the word matches a capitalization variation in the lexicon, and
do not change the capitalization of the word if it was determined to match a capitalization variation in the lexicon.

24. The apparatus of claim 22 wherein the means for performing a capitalization correction function
determine if the capitalization of the word matches a capitalization variation in the lexicon, which capitalization variation meets a frequency criteria, and
do not change the capitalization of the word if it was determined to match a capitalization variation in the lexicon.

* * * * *